INVENTOR
CARROL C. SACHS

Dec. 3, 1968 C. C. SACHS 3,414,016
FLUID CONTROL APPARATUS

Filed Aug. 18, 1966 2 Sheets-Sheet 2

INVENTOR
CARROL C. SACHS.
BY *Roger A. Marrs*

United States Patent Office 3,414,016
Patented Dec. 3, 1968

3,414,016
FLUID CONTROL APPARATUS
Carrol C. Sachs, 9938 Cybourn Ave.,
Sunland, Calif. 91040
Filed Aug. 18, 1966, Ser. No. 573,388
6 Claims. (Cl. 137—596.2)

ABSTRACT OF THE DISCLOSURE

A high temperature valve is disclosed herein having a body formed with passage means through said body in communication with three ports. The passage means includes valves seat means therein and a pair of poppet means for selectively controlling the flow of air through the passage means between one of said ports and either of the other of said ports. The poppet means includes silicone rubber sealing members for engaging said valve seat means, spring means for urging said sealing members against said valve seat means, and lever means for moving said poppet means in opposition to said spring means to a location wherein said sealing members are remote from said valve seat means.

---

This invention relates to an apparatus for controlling fluid flow, and more particularly to a novel valve device for providing more precise control for metering fluids such as in effecting the removal of air in vacuum systems and especially when the valve may be subjected to high temperatures and contamination.

One use for which the valve of this invention is especially adapted is in vacuum systems employed for pressure forming laminated plastic parts. To produce such parts, a bag forming and skin packing process may be followed. By that method, layers of resin-impregnated glass cloth or the like are layed up on a die having a configuration conforming to that desired for a completed part. The die and laminations then are inserted into an airtight flexible container, generally a bag of polyvinyl alcohol material, which is sealed and evacuated in order to apply atmospheric pressure to the part. In some instances the bag is located in an autoclave for achieving greater pressures, and normally it is subjected to heat for curing the resin of the part. The sealant for the open end of the bag is usually zinc chromate which is applied along mating marginal surfaces of the end of the bag.

A length of tubing is inserted between a portion of the mating marginal surfaces into the bag and connected to a source of vacuum for drawing air from within the bag. A simple plug valve has been included in the vacuum line to either connect or disconnect the interior of the bag and the source of vacuum. When the bag initially is subjected to a vacuum, the sheet material of the bag invariably forms wrinkles, including wrinkles where the bag contacts the laminations to be cured. Such wrinkles are unacceptable, at least in many areas of a typical part, because the wrinkles mark the part as the pressure is applied and the cure is effected resulting in a lamination not strictly corresponding to the die. This necessitates the additional step of removing wrinkles in the bag material from critical areas of the part before the part is cured.

In the past, it has been customary to break the seal at the end of the bag by separating the marginal edges so that the vacuum is released and the wrinkles may be worked away from the part. A partial vacuum is necessary as the bag is straightened, however, so that the wrinkles can be effectively moved yet no new wrinkles will take their places. Therefore, the valve in the vacuum line is left open and the seal is broken at only a limited portion of the end of the bag. This enables the vacuum pump to maintain the pressure within the bag at a value below atmospheric. After the wrinkles have been removed, the open end of the bag again is sealed, full vacuum is pulled and the remainder of the forming process may take place.

This procedure obviously is disadvantageous because of the time involved in first separating the marginal portions of the bag to break the seal and then resealing after the wrinkles have been removed. Care must be exerted to provide only a limited aperture into the bag when the opening is made so that a partial vacuum can be maintained by continued operation of the vacuum pump. In addition, the open connection between the atmosphere and the vacuum line permits contamination of the vacuum source as air continuously is drawn into the bag and then out through the vacuum line. Also, of course, the vacuum source must perform the work of pumping air all during the time the wrinkles are being removed from the bag.

One of the most troublesome conditions with conventional bag forming is encountered after the assembly has been heated. Frequently, the valves in the vacuum line stick after being subject to heat, becoming very difficult to operate and requiring early replacement. Only a simple "on" or "off" type control is possible with the valves customarily employed.

According to the provisions of this invention, a valve may be included in the vacuum line which provides a close control of the amount of vacuum in the bag, is quick and easy to operate, and is not adversely effected by elevated temperatures. One embodiment of this valve includes a body having three ports, one of which may be connected to either of the other two as controlled by two spring pressed poppets. A resilient seal of silicone rubber is included in each poppet, and cam-lever actuators operate each poppet independently. This valve is used in bag forming to maintain the proper pressure within the bag at all times.

Aside from providing an excellent closure seal, the valve is not subject to stoppage or faulty operation which normally occurs when conventional valves are employed, since the valve of the present invention is not susceptible to contamination. Because of this feature, the valve may be readily employed in fluid dispensing applications such as soda or water valves in the food industry where sanitation is of paramount importance or for certain types of exotic fluid control in the atomic energy processes and systems. In instances requiring precisely metered mixing of different fluids, the present valve has been of particular advantage such that the spring biased poppets are independently controlled by the cam-lever actuators that may be manually operated or may be incorporated into an automatic powered or electro-mechanical operating system. Such a system is susceptible to be programmed to effect the desired metered mixing of the fluids.

Therefore, it is a primary object of the present invention to provide a novel valve apparatus operable to precisely control metered fluids throughout a process cycle that is resistant to high temperatures.

Another object of the present invention is to provide a novel fluid control valve having improved control characteristics including effective closure and freedom from contamination.

An additional object of the present invention is to provide an improved arrangement for vacuum bag forming whereby the vacuum created may be precisely bled from the interior of the bag by a manually operated actuator.

Yet another object of the present invention is to provide a novel valve which gives ease of operation and durability of service, particularly in fluid control and dispensing applications requiring sanitary handling of the fluid.

A further object of this invention is to provide an improved arrangement for controllably removing wrinkles in a bag forming operation without necessitating the separation of the edge marginal regions of adjacent bag sides.

Yet another object of this invention is to provide means for selectively controlling the pressure within a sealed container as employed in applications requiring pressure to be applied to a part.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
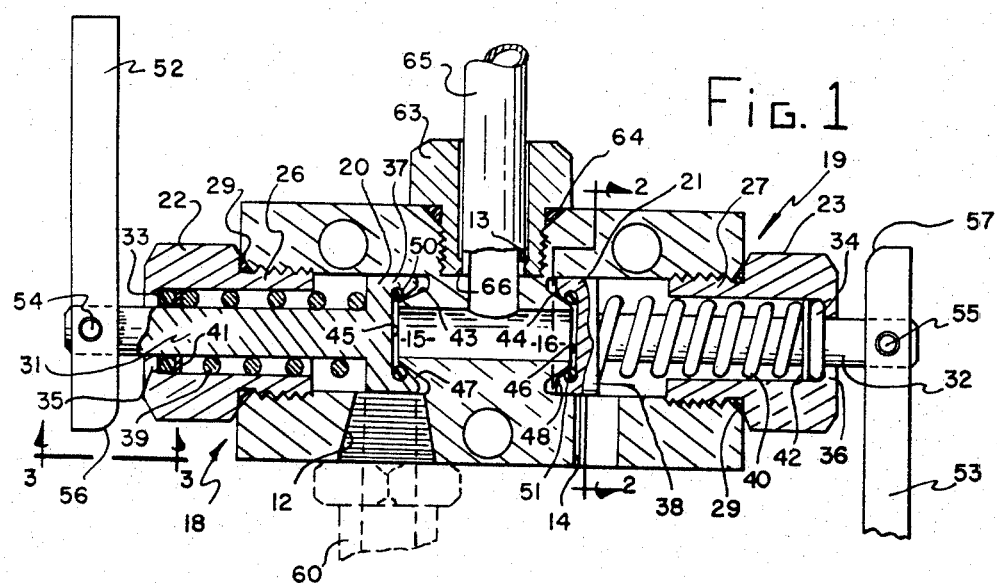
FIGURE 1 is a sectional view of the fluid control valve of the present invention.
Figure 3:
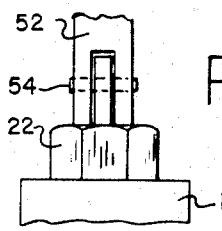
FIGURE 3 is a fragmentary side elevational view of the valve arrangement of FIGURE 1 showing the bifurcated end portion of the cam-lever actuator employed for one of the poppets.
Figure 2:
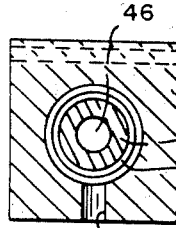
FIGURE 2 is a sectional view of the valve shown in FIGURE 1 as in the direction of arrows 2—2 thereof, illustrating the end of the poppet and its sealing seat.

Referring to FIGURES 1, 2 and 3, a fluid control valve in accordance with the present invention is indicated in the general direction of arrow 11 that preferably is of stainless steel material and is provided with intercommunicating ports 12, 13 and 14, the former two of which are threaded in the embodiment shown. Passageways 15 and 16 provide communication through the valve body interconnecting the ports. Poppet assemblies 18 and 19 are inserted in the ends of the body and carry reciprocative poppets or plungers 20 and 21, respectively, for controlling the flow of fluid through passageways 15 and 16. The shanks of poppets 20 and 21 are received within threaded members 22 and 23, conveniently formed with hexagonal heads located outside of the valve body at its extreeme opposite ends while the threaded portions 26 and 27 of these members are held within complementary threaded end openings in valve body 11. Seals 29, preferably of heat resistant material such as silicone rubber and in the form of O-rings, prevent leakage around the exterior of the poppet assemblies. The ends of the body are recessed for receiving these O-rings which will seal effectively even when the threaded members 22 and 23 are only finger tight within the openings in the ends of the body. This feature greatly enhances and facilitates ready maintenance and repair.

Poppet shanks 31 and 32 extend out through the hexagonal heads of members 22 and 23 and are sealed to prevent leakage by O-rings 33 and 34 adjacent shoulders 35 and 36 formed in the threaded members. Preferably again, a high temperature resistant material such as silicone rubber is utilized for the seal. Poppet closure heads 37 and 38 of the poppet assemblies are engaged by expansion springs 39 and 40, the other ends of which bear against washers 41 and 42. A spring force, therefore, forcibly urges the heads of the poppets against annular tapered valve seats 43 and 44 to close passageways 15 and 16. The spring force reacting through washers 41 and 42 also urges the O-rings 33 and 34 against shanks 31 and 32 of the poppets and the bores of members 22 and 23 to assure that a seal will be maintained. The poppet closure heads are provided with coaxial recesses 45 and 46 having annular converging tapered sidewalls 47 and 48 defining the recesses. At the base of the sidewalls terminating at the bottom of the recesses, elastomeric seals 50 and 51 are provided and which are disposed within retainer grooves formed in the closure heads so that the seals are held therein by means of an interference type fit. The poppet heads' tapered sidewalls mate with the tapered seats 43 and 44 so that terminating ends thereof engage with seals 50 and 51 in an airtight manner when the poppets are urged thereagainst by the springs. Silicone rubber is used for the composition of these seals just as for the O-rings previously mentioned.

Actuation of the poppets is effected by cam-levers 52 and 53 which are pivoted on pins 54 and 55 to the outer ends of the poppet shanks. These actuating members include bifurcated cam ends 56 and 57 which are rounded on one edge and adapted to engage the ends of hexagonal head members 22 and 23. The lengths of these cam ends beyond their pivot points 54 and 55 are such that when they are moved to a position of alignment of the poppet shafts, they react against heads 22 and 23 to move the poppets axially. By this construction, if a lever 53 is pivoted, for example, cam end 57 reacts against head 23 thereby axially moving the poppet in opposition to spring 40 retracting poppet head 21 away from valve seat 48. This opens passageway 16 thereby interconnecting port 13 and port 14.

At the same time if lever 52 is in the position of FIGURE 1, where it does not engage or react against the end of hexagonal head 22, the cam-lever will exert no force on the poppet so that spring 39 will hold poppet head 37 against valve seat 43 closing passageway 15. Seal 50 assures that there then will be no connection between ports 13 and 12 or ports 14 and 12.

It can be seen, therefore, that actuation of the poppets is effected independently, and simply by pivoting the actuating members through an arc. The cam type of movement of the poppet permits close control of the poppet, but at the same time is trouble free and easy to operate. All of the seals in the valve are particularly effective in preventing any fluid leakage and, of course, are resistant to elevated temperatures. The construction of the valve is such that the parts will not stick or become difficult to operate regardless of the type of usage to which the valve is applied. Repeated high temperature cycles cause no loss of effectiveness of this valve.

When the valve of this invention is used in a bag forming operation, for example, port 12, which is provided with pipe threads, receives fitting 58 of conventional vacuum line 60 connecting to a suitable remote vacuum source which includes an accumulator 61, and a vacuum pump 62. Port 13 is provided with straight threads and fitting 63 engages the valve body within this port. Silicone rubber O-ring 64 seals at the head of fitting 63, and the body may be recessed as shown to receive this O-ring. Stainless steel flexible tubing 65 is connected to fitting 63 being brazed or welded at numeral 66 to the inner end of this fitting. This type of connection provides a support for the tubing and a more durable arrangement results. Fitting 63 holds tubing 65 throughout the axial length of the fitting, thereby forming an outer tubular support which maintains rigidity adjacent the joint 66 at the end of tubing 65. Because of this, the joint lasts much longer than it would if it were otherwise positioned, such as at the opposite end of the fitting where no such support would be provided.

Figure 4:
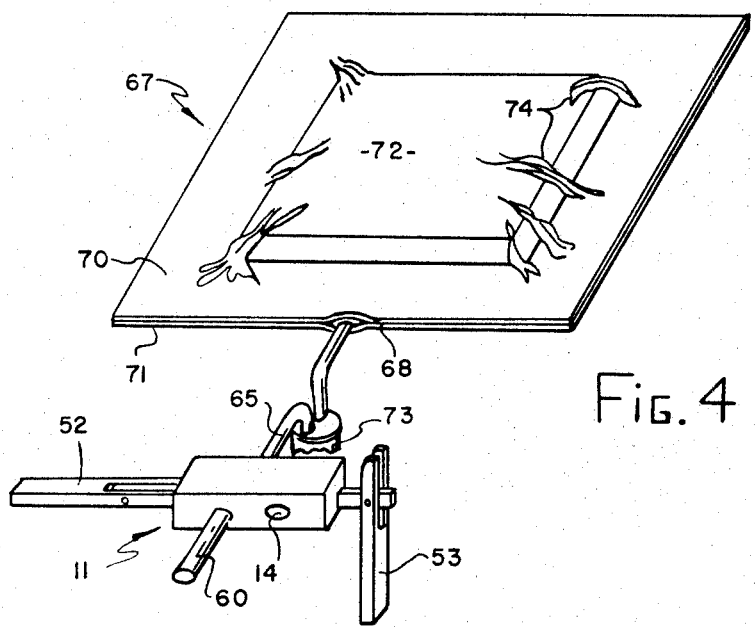
FIGURE 4 is a perspective view of the valve apparatus of FIGURE 1 employed in conjunction with a bag forming arrangement when a vacuum is drawn initially within the bag.
Figure 5:
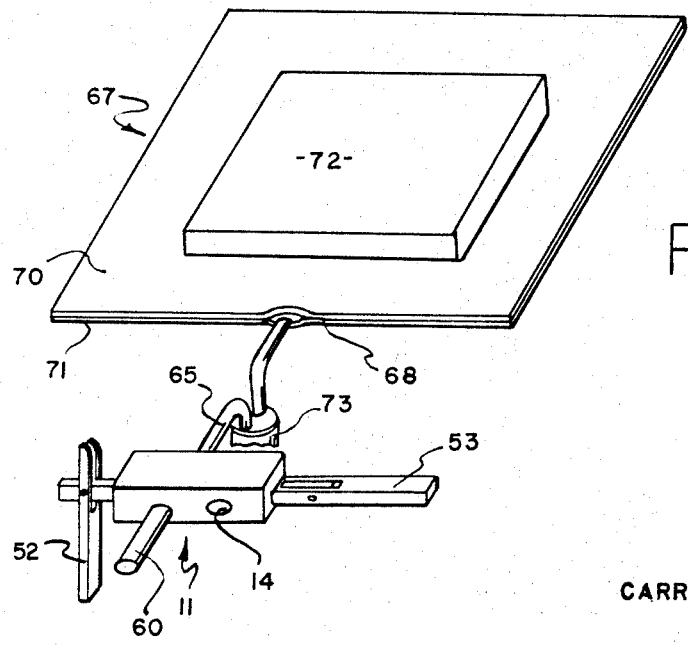
FIGURE 5 is a perspective view, similar to FIGURE 4, but with the wrinkles in the bag material removed.

Tubing 65 provides a conduit extending to a bag 67 of airtight, flexible material such as polyvinyl alcohol, as may be seen in FIGURES 4 and 5. The tubing passes through end 68 of the bag where the edges of upper and lower sheets 70 and 71 are sealed by zinc chromate. A part 72, located within the bag, is a lay-up of plastic-impregnated cloth or the like over a die, and is to be pressurized and cured within the bag. Preferably, a filter 73 is coupled into tubing 65 that is suitable for collecting sediments, foreign matter or other forms of contaminants so that the fluid will be maintained as clean as possible.

Figure 7:
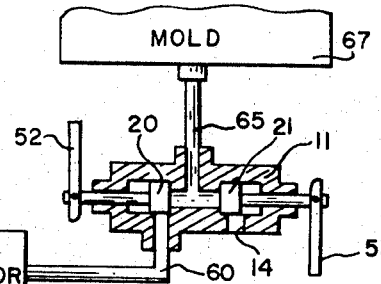
FIGURE 7 is a schematic view, similar to FIGURE 6, but with the valve closed to seal off the interior of the bag.
Figure 6:
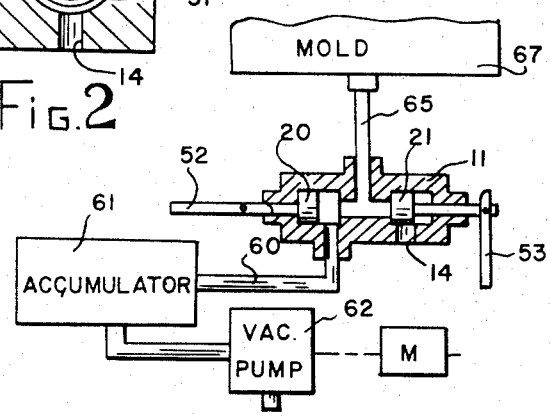
FIGURE 6 is a schematic valve illustrating the valve of FIGURE 1 in position for drawing air from within the bag to remove material wrinkles.

With the elements so arranged, the valve is positioned as schematically illustrated in FIGURE 6 to close port 14 and open port 12 so that vacuum source 62 evacuates air from within container 67 through line 65 and the valve. Ambient atmospheric pressure forces the bag tightly around part 72. When this is done, wrinkles 74 form in the bag material around the part, as seen in FIGURE 4, and these must be removed before the assembly is subjected to heat for curing the part. Instead of breaking the seal at end 68 of the bag, port 12 then is closed disconnecting the interior of the bag from the vacuum source. After this, port 14 is opened momentarily so as to bleed in a limited quantity of air to the interior of the bag, reducing the vacuum. The poppet 21 is easily controlled to allow any desired amount of air to enter the bag so that optimum conditions for moving the wrinkles are obtained. As soon as this condition exists, poppet 21 is closed to the position of FIGURE 7 so that the valve maintains the bag interior sealed both from the atmosphere and from the vacuum source and the partial vacuum is maintained. The wrinkles then are removed following which poppet 20 is opened (repositioning the valve as shown in FIGURE 6) to connect the bag with the source of vacuum and the part becomes pressurized in a smooth, wrinkle-free bag.

By this arrangement, it is possible to remove the wrinkles from the part much more quickly than as accomplished by prior practices without wasting or contaminating the vacuum source. It is not necessary to break the seal along the edge of the bag at any time and a close control of the air supply is obtained so that ideal conditions for removal of the wrinkles can be achieved.

It can be seen from the foregoing, therefore, that I have provided an improved valve of serviceable construction, usable at high temperatures without danger of stocking. While by no means limited to such purpose, this valve is especially effective in providing an improved means for controlling the vacuum applied to a bag for pressure-forming plastic laminated parts.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A high temperature valve comprising:
a body having three ports;
passage means through said body in communication with said ports, said passage means including valve seat means therein; and
a pair of poppet means for selectively controlling the flow of air through said passage means between one of said ports and either of the other of said ports, said poppet means including silicone rubber sealing members for engaging said valve seat means, spring means for urging said sealing members against said valve seat means, and lever means for moving said poppet means in opposition to said spring means to a location wherein said sealing members are remote from said valve seat means.

2. A high temperature valve comprising:
a body;
passage means through said body, said passage means including valve seat means therein; and
a pair of poppet means for controlling the flow of air through said passage means, said poppet means including silicone rubber sealing members for engaging said valve seat means, spring means for urging said sealing members against said valve seat means, and lever means for moving said poppet means in opposition to said spring means to a location wherein said sealing members are remote from said valve seat means;
each of said poppet means comprises a plunger; threaded means carrying said plunger and threadably engaging said body;
said plunger being axially reciprocative relative to said threaded means and projecting beyond said threaded means; and said lever means including
a lever pivotally connected to said plunger at a location remote from said body, one end of said lever including a cam surface for engaging a surface of said threaded means and forcing said plunger outwardly against the opposition of said spring for thereby separating said plunger from said valve seat.

3. The invention as defined in claim 2 in which said passage means includes an internally threaded port, and further including a relatively short tubular member one end of which is threadably received in said opening, and a second and elongated tubular member in said first mentioned tubular member and extending therefrom, said second tubular member being attached to said first tubular member adjacent said one end of said first tubular member whereby said first tubular member provides a support means for said second tubular member adjacent said attachment thereto.

4. The invention as defined in claim 2 wherein said plunger includes a recess formed on one end thereof for retaining said sealing member and wherein said valve seat means includes a tapered seating surface adopted to be received within said plunger recess to sealingly engage with said sealing member.

5. The invention as defined in claim 4 wherein said plunger recess is defined by an annular tapered sidewall substantially corresponding to effectively mate with said tapered seating surface of said valve seat means.

6. A high temperature air valve comprising:
an elongated stainless steel body, said body having a duality of ports in one side thereof and a single port in the opposite side thereof;
passage means in said body interconnecting said ports;
a duality of threaded members, said members being sealingly received in opposite ends of said body;
a poppet reciprocatively carried by each threaded member, each poppet including a recessed head and having an annular silicone rubber seal carried in said recessed head;
a duality of annular tapered valve seats in said body, each of which is engagable by one of said seals for controlling the flow of fluid through said valve between said ports, each poppet being further provided with an elongated shank projecting out through the threaded member carrying the poppet;
a duality of springs in said body, each of said springs being located around said shank of said poppet and engaging the head of the poppet for normally holding said head in a position to engage said seal thereof with a valve seat;
a duality of levers, each of said levers being pivotally connected to the shank of a poppet outside the threaded member supporting said poppet, each of said levers having a rounded end portion for engaging the outer surface of a threaded member, the end of said lever being dimensioned with respect to the pivotal connection of said lever to the poppet so that pivotal movement of said lever with respect to said poppet reacts against said outer surface of said threaded member and axially moves said poppet in opposition to said spring engaging the same for separating said seal from said valve seat.

References Cited

UNITED STATES PATENTS

| | | | |
|---|---|---|---|
| 914,400 | 3/1909 | Firth | 137—606 |
| 2,587,569 | 2/1952 | Giauque | 251—333 |
| 2,634,748 | 4/1953 | Morrison | 251—83 XR |
| 3,032,068 | 5/1962 | Bunyan | 137—606 XR |
| 3,167,091 | 1/1965 | Holdren | 137—606 XR |

FOREIGN PATENTS

| | | |
|---|---|---|
| 1,291,904 | 3/1962 | France. |
| 178,232 | 4/1922 | Great Britain. |

HENRY T. KLINKSIEK, *Primary Examiner.*